United States Patent
Pong et al.

(10) Patent No.: US 8,718,065 B2
(45) Date of Patent: May 6, 2014

(54) TRANSMISSION USING MULTIPLE PHYSICAL INTERFACE

(75) Inventors: Fong Pong, Mountain View, CA (US); Chun Ning, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 687 days.

(21) Appl. No.: 11/802,210

(22) Filed: May 21, 2007

(65) Prior Publication Data

US 2008/0043742 A1 Feb. 21, 2008

Related U.S. Application Data

(60) Provisional application No. 60/837,639, filed on Aug. 15, 2006.

(51) Int. Cl.
*H04L 12/56* (2011.01)

(52) U.S. Cl.
USPC .............................. 370/394; 710/11

(58) Field of Classification Search
None
See application file for complete search history.

(56) References Cited

U.S. PATENT DOCUMENTS

| | | | |
|---|---|---|---|
| 6,453,408 B1 * | 9/2002 | Stuart Fiske et al. ........... | 712/29 |
| 6,845,420 B2 * | 1/2005 | Resnick ........................ | 710/303 |
| 7,254,133 B2 * | 8/2007 | Govindarajan et al. ........ | 370/394 |
| 7,427,871 B2 * | 9/2008 | Kelem et al. ...................... | 326/9 |
| 7,444,506 B1 * | 10/2008 | Datta et al. ..................... | 713/153 |
| 7,587,554 B2 * | 9/2009 | Deng et al. ..................... | 711/115 |
| 7,822,594 B2 * | 10/2010 | Haviv et al. ..................... | 703/21 |
| 2005/0149624 A1 * | 7/2005 | Jakubiec et al. .............. | 709/217 |
| 2007/0030826 A1 * | 2/2007 | Zhang et al. .................. | 370/331 |
| 2007/0174835 A1 * | 7/2007 | Xu et al. ........................ | 717/176 |
| 2007/0260747 A1 * | 11/2007 | Samzelius et al. ............ | 709/238 |
| 2008/0013568 A1 * | 1/2008 | Poetker et al. ................ | 370/465 |

* cited by examiner

*Primary Examiner* — Rhonda Murphy
(74) *Attorney, Agent, or Firm* — Sterne Kessler Goldstein & Fox PLLC

(57) ABSTRACT

A method to transmit data using a device having a plurality of physical input/output (I/O) interfaces is provided. The method comprises receiving data and determining a topology according to which data is to be transmitted. Data is transmitted in sequential order via a single physical interface for a first topology and in random order via a plurality of physical interfaces for a second topology.

A System On Chip (SOC) unit enabled to transmit data via one or more physical interfaces is provided. The SOC comprises a processor and a network interface including multiple physical input/output (I/O) interfaces coupled to the processor. In response to receiving data for transmission, the processor is enabled to select a single I/O interface for sequential data transmission according to a first topology or select multiple physical I/O interfaces for random order data transmission according to a second topology.

21 Claims, 12 Drawing Sheets

TRANSMISSION USING MULTIPLE PHYSICAL INTERFACE

CROSS-REFERENCE TO RELATED APPLICATIONS

This application claims the benefit of U.S. Provisional Application No. 60/837,639 filed Aug. 15, 2006, which is incorporated herein by reference in its entirety.

BACKGROUND OF THE INVENTION

1. Field of the Invention

The present invention generally relates to communications systems.

2. Background Art

Multiple devices can be configured in Peripheral Component Interconnect (PCI) input/output (I/O) tree topology. A host bridge often defines the PCI root of a hierarchical PCI tree topology. However, for communication between devices that have multiple I/O interfaces and are not required to follow a PCI topology, inter-device data transfer latency is often long. This is because data is transmitted sequentially via a single I/O interface. Furthermore, a device having multiple I/O interfaces cannot take full advantage of the I/O bandwidth when following a PCI model for all transmissions.

Methods and systems are needed to overcome the above mentioned deficiencies.

BRIEF SUMMARY OF THE INVENTION

Methods, systems and computer program products to transmit data via multiple physical input/output (I/O) interfaces are provided.

The method comprises receiving data and determining a topology according to which data is to be transmitted. Data is transmitted in sequential order via a single physical interface for a first topology and in random order via a plurality of physical interfaces for a second topology.

A System On Chip (SOC) unit enabled to transmit data via one or more physical interfaces is provided. The SOC comprises a processor and a network interface including multiple physical input/output (I/O) interfaces coupled to the processor. In response to receiving data for transmission, the processor is enabled to select a single I/O interface for sequential data transmission according to a first topology or select multiple physical I/O interfaces for random order data transmission according to a second topology.

In an embodiment, the first topology is a Peripheral Component Interconnect (PCI) topology and the second topology is a Cache Coherent Non Uniform Memory Access (CCNUMA) topology.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 3:
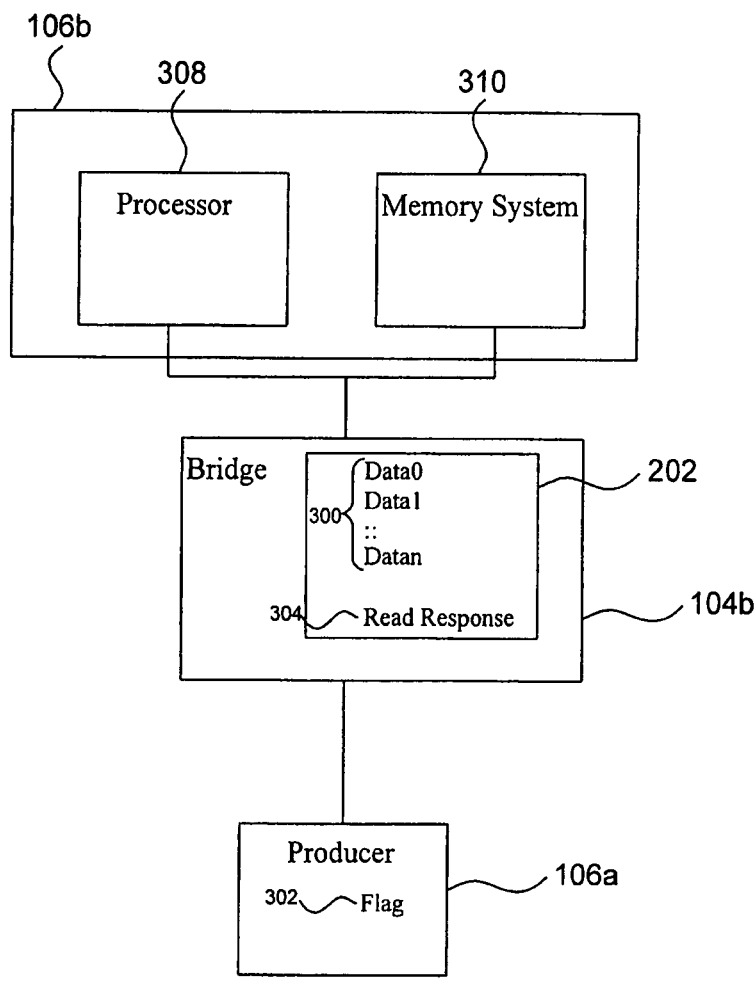

FIG. 3 illustrates an example data transaction between device 106a (a producer) and device 106b (a consumer) via bridge 104b in a PCI topology.

Figure 4:
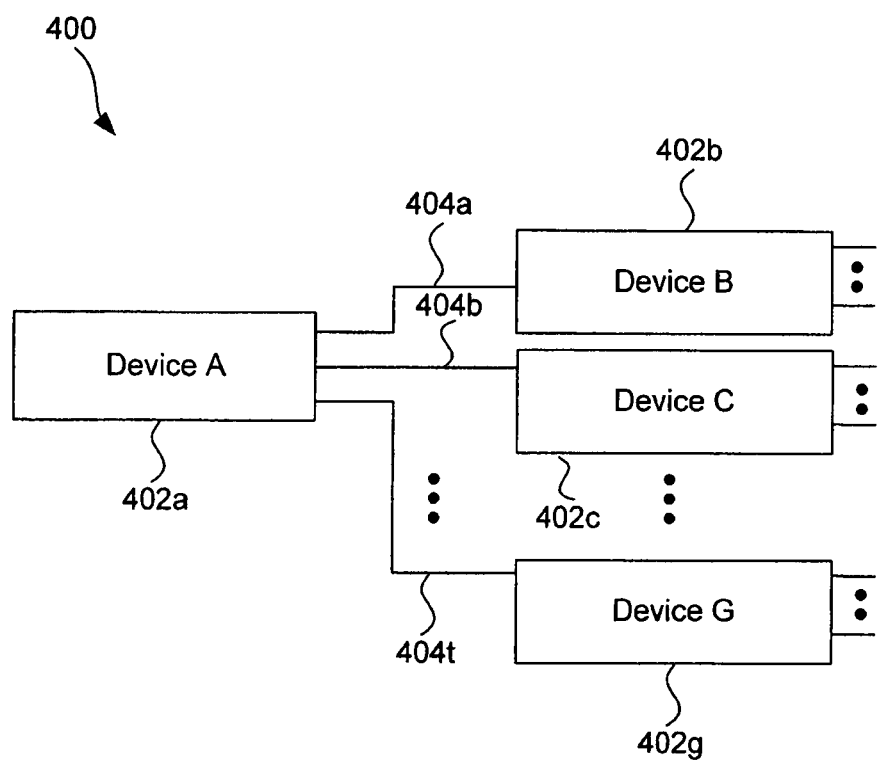

FIG. 4 illustrates an example system comprising devices with multiple physical interfaces in a PCI topology.

Figure 5:
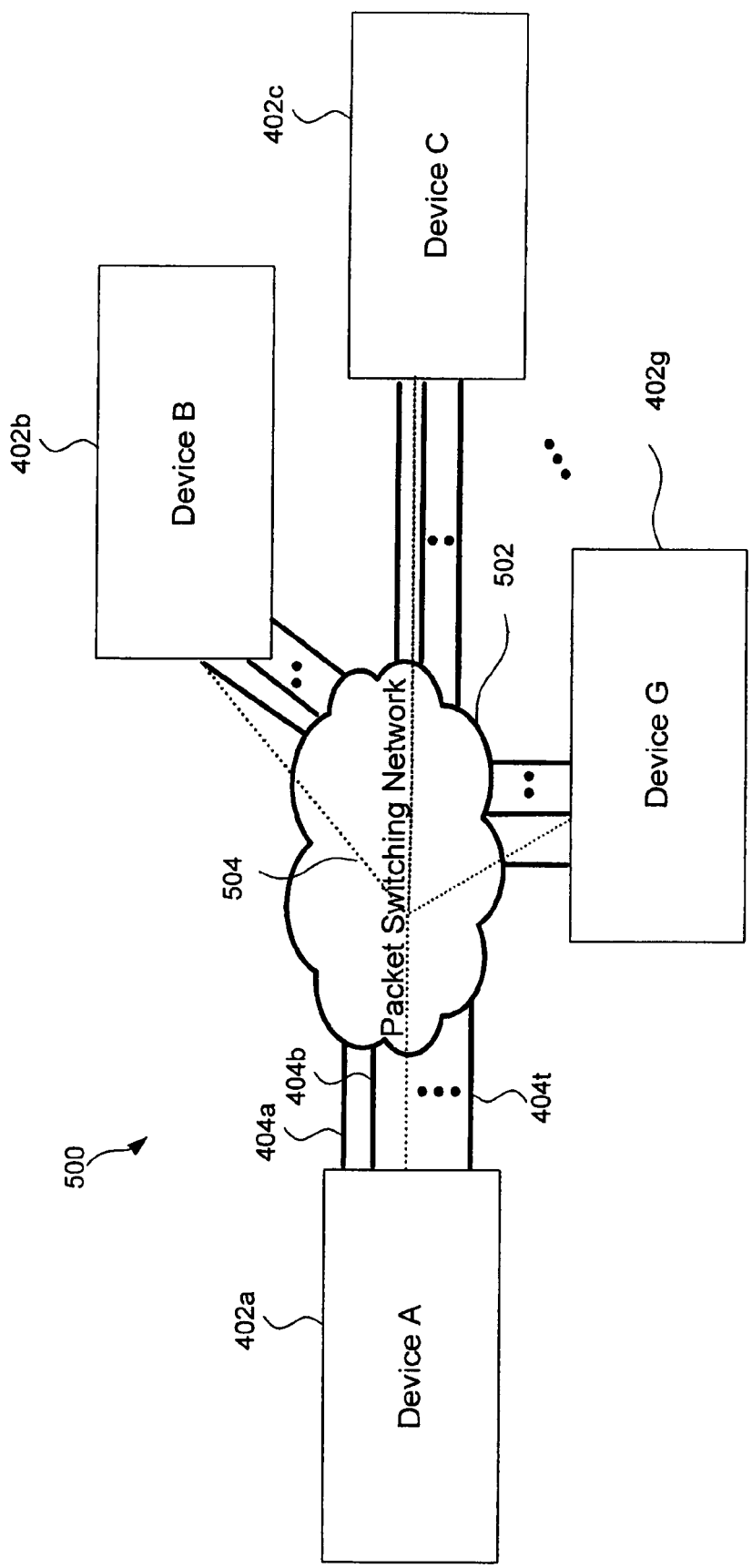

FIG. 5 illustrates an example system comprising devices with multiple physical interfaces according to an embodiment of the invention.

Figure 6:
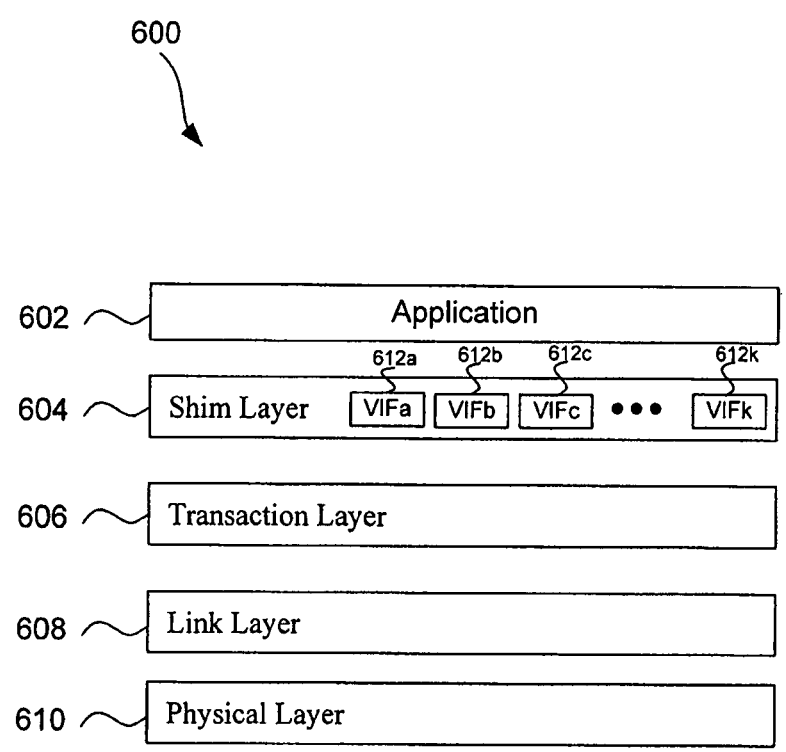

FIG. 6 illustrates an exemplary communication stack 600 according to an embodiment of the invention.

Figure 7A:
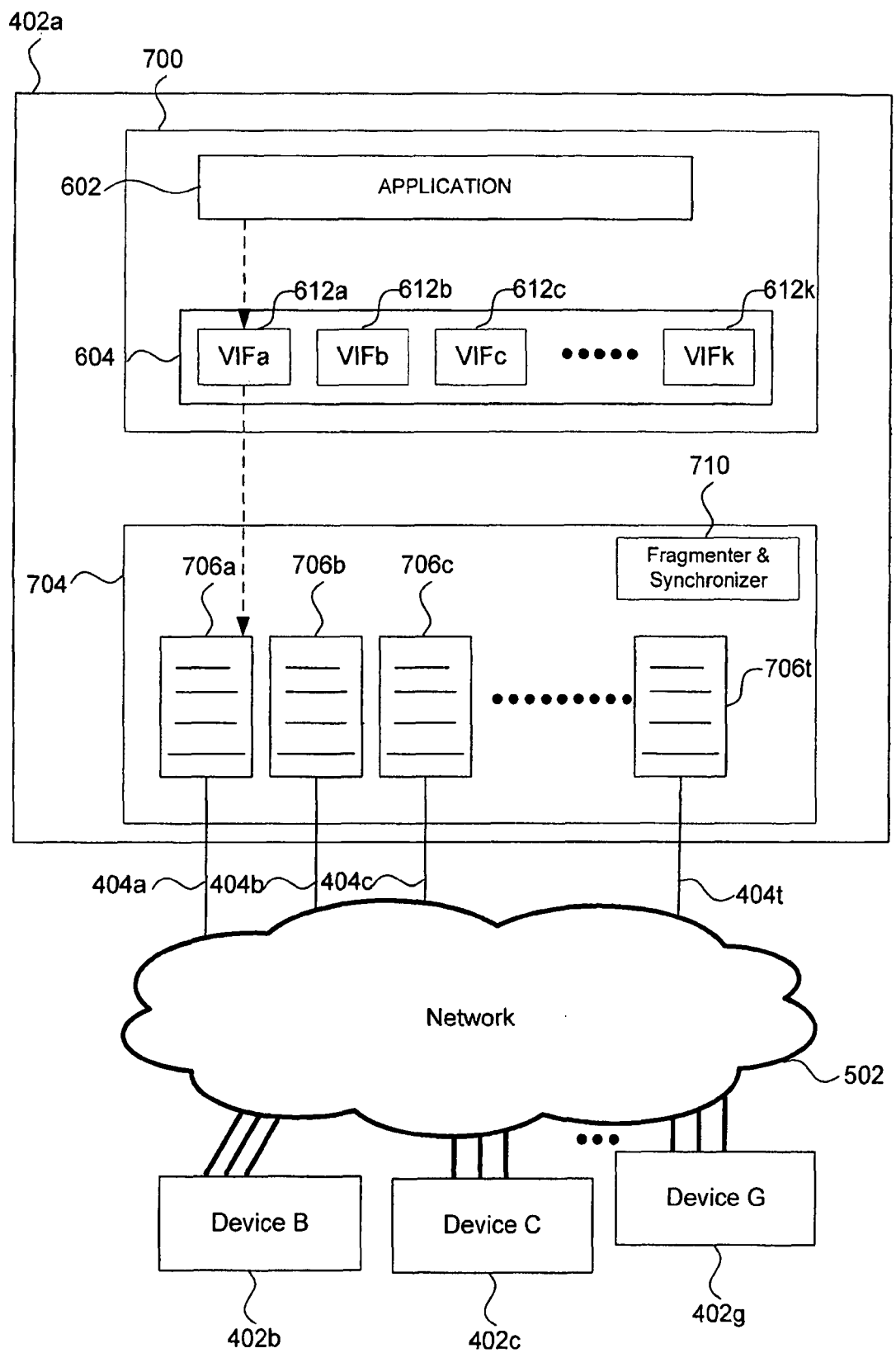

FIG. 7A illustrates an example of a first mapping between a virtual interface and a physical interface according to an embodiment of the invention.

Figure 7B:
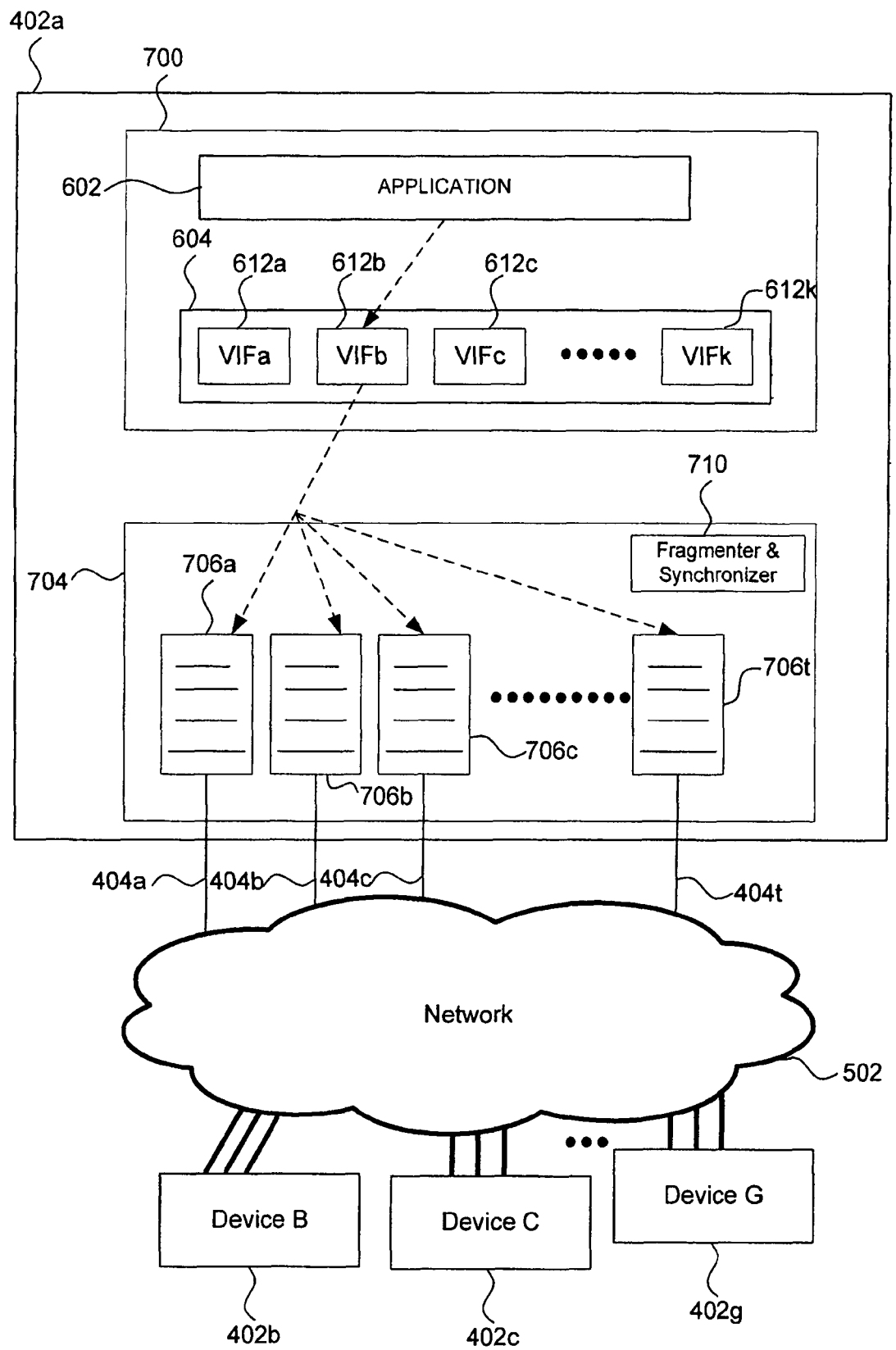

FIG. 7B illustrates an example of a second mapping between a virtual interface and physical interfaces according to an embodiment of the invention.

Figure 7C:
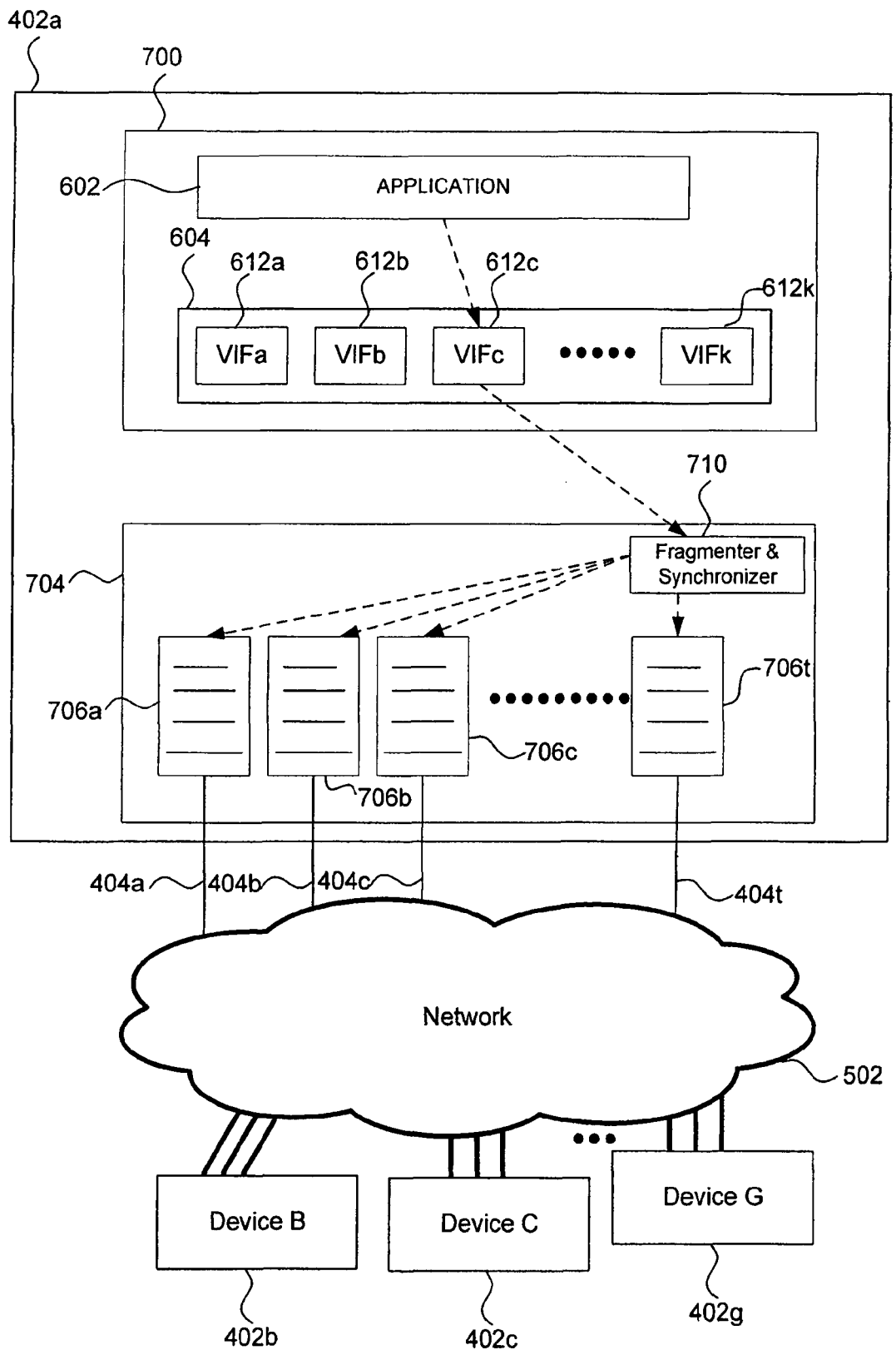
Figure 8:
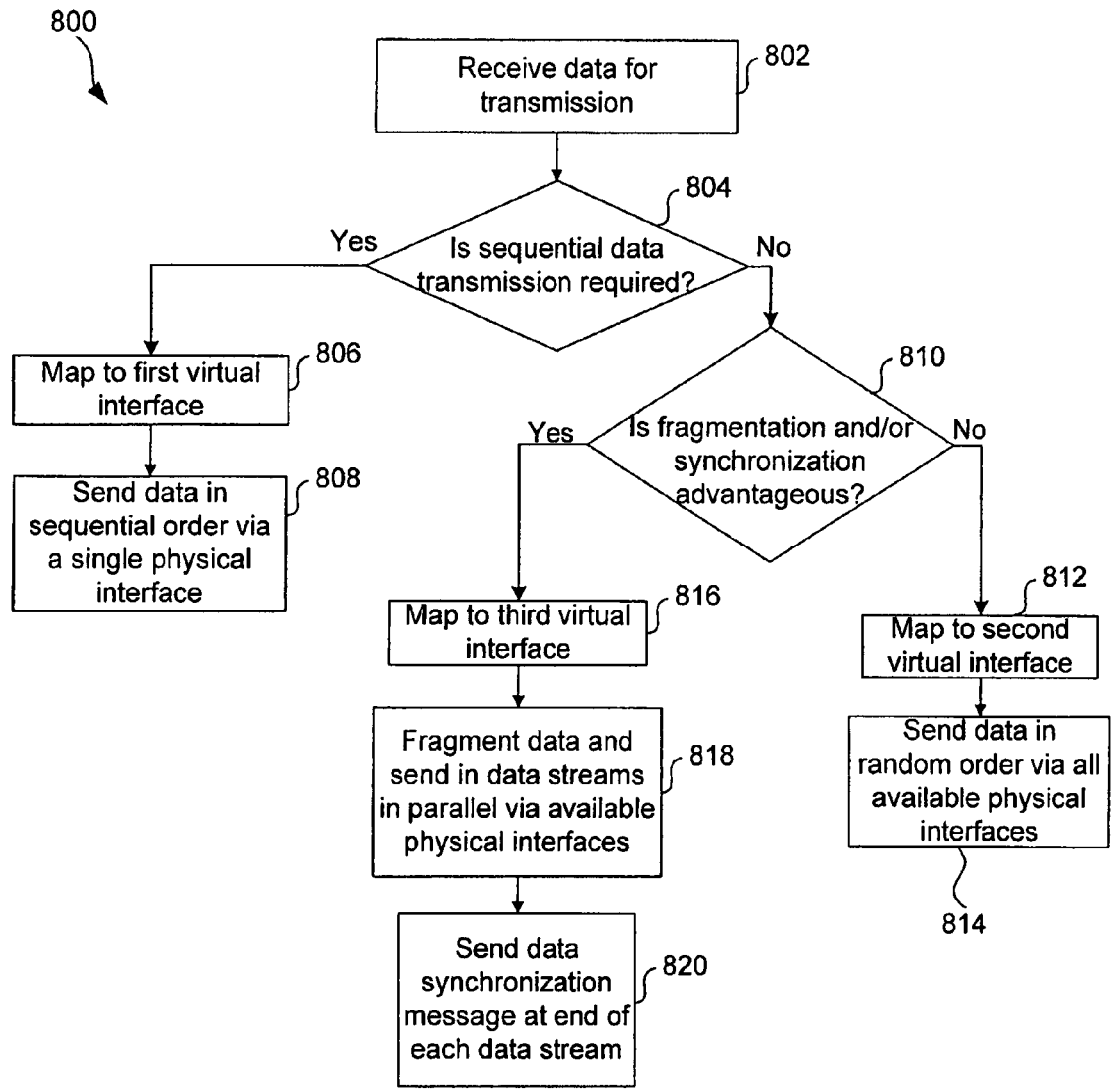

FIG. 7C illustrates an example of a third mapping between a virtual interface and physical interfaces according to an embodiment of the invention FIG. 8 illustrates an example flowchart of a method for transmitting data using a device having multiple I/O interfaces according to an embodiment of the invention.

Figure 9:
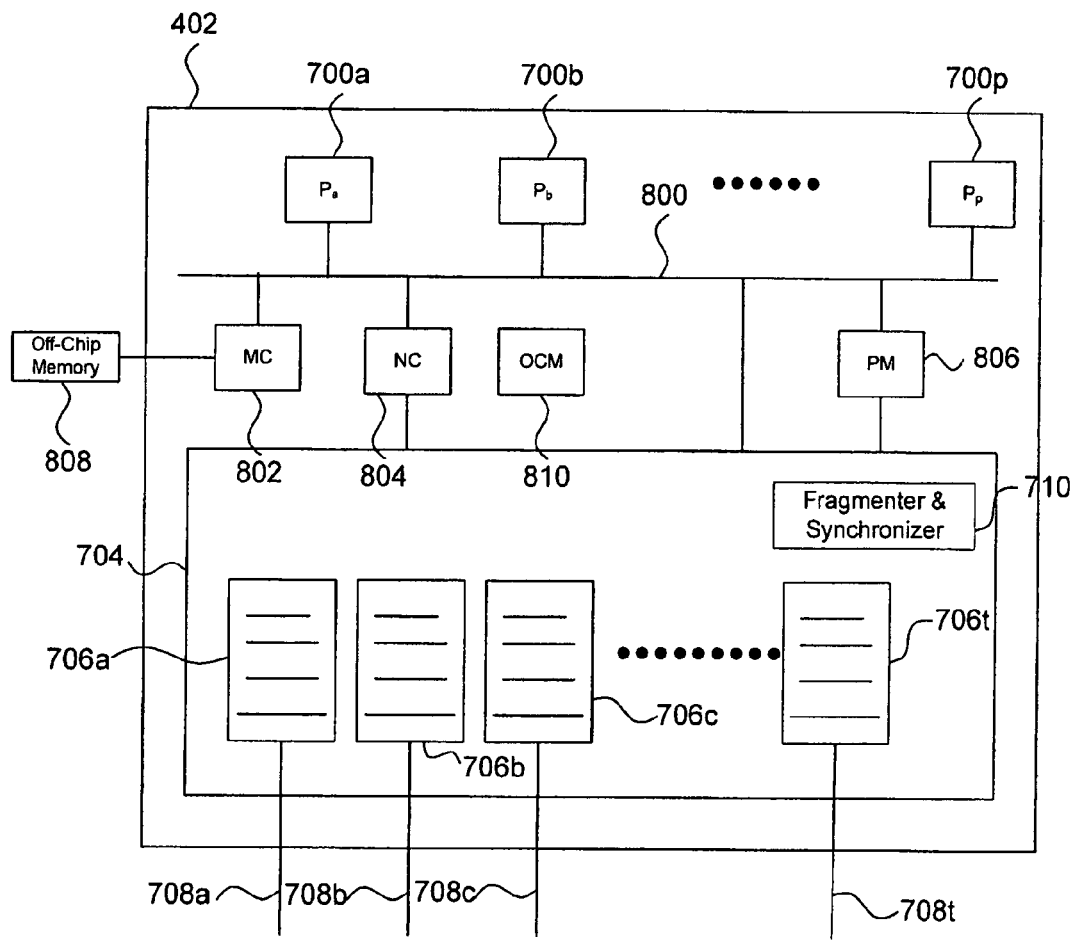

FIG. 9 illustrates a System on Chip (SOC) according to an embodiment of the invention.

Figure 10:
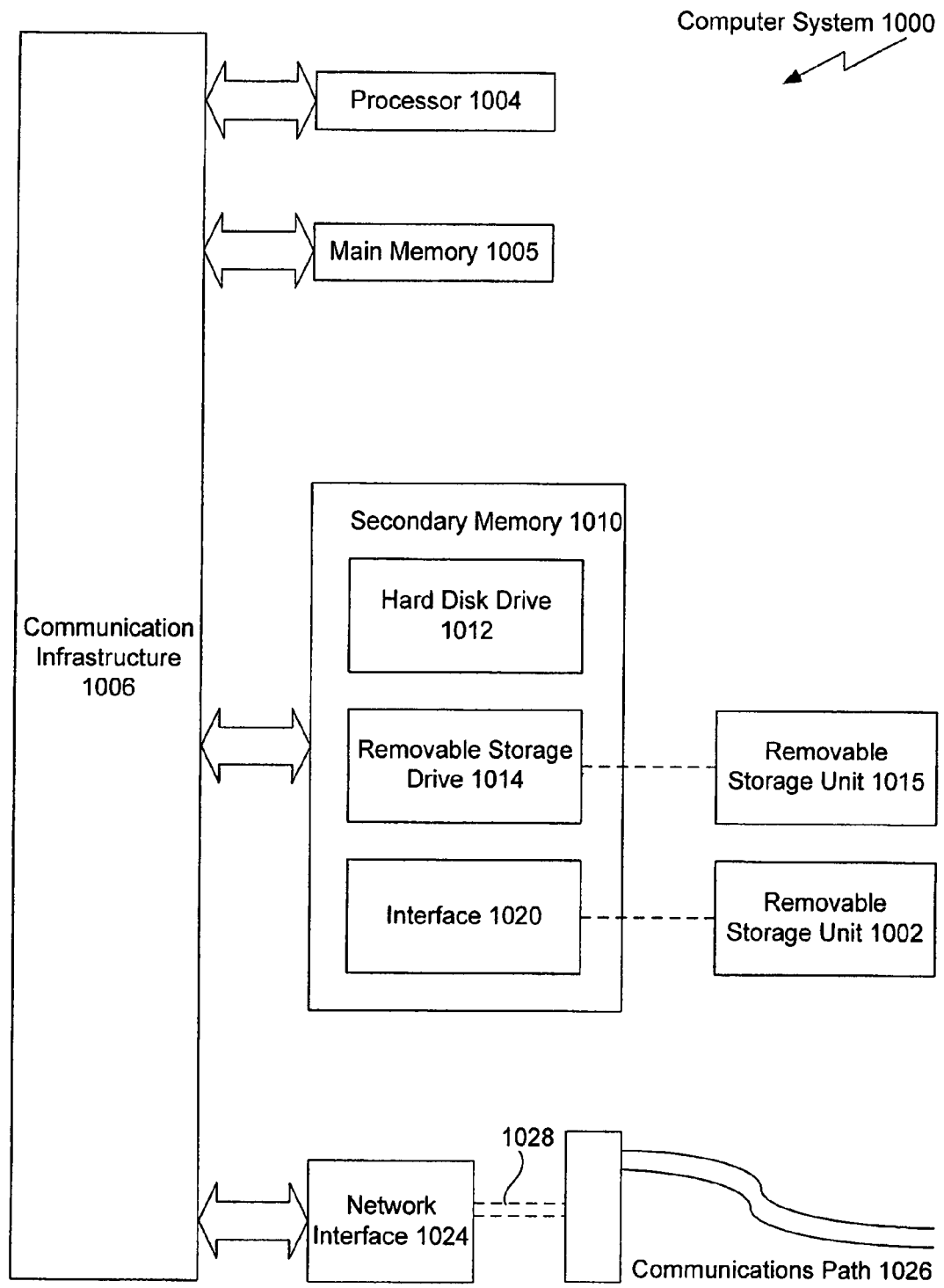

FIG. 10 is a block diagram of a computer system on which the present invention can be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention provides methods to enable a device having multiple physical input/output (I/O) interfaces to transmit data via the one or more physical I/O interfaces based on a bus protocol or network topology in use. According to an embodiment, the multiple I/O interfaces are configured as a single aggregated I/O interface. When transmitting a large amount of data, based on application requirements or underlying network topology, all available I/O interfaces are utilized. Using all available I/O interfaces when permissible results in high bandwidth and short latency for across-chip communication. The option of using a single I/O interface for sequential data transmission if required by an application or underlying bus topology is provided.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Example PCI Topology

Figure 1:
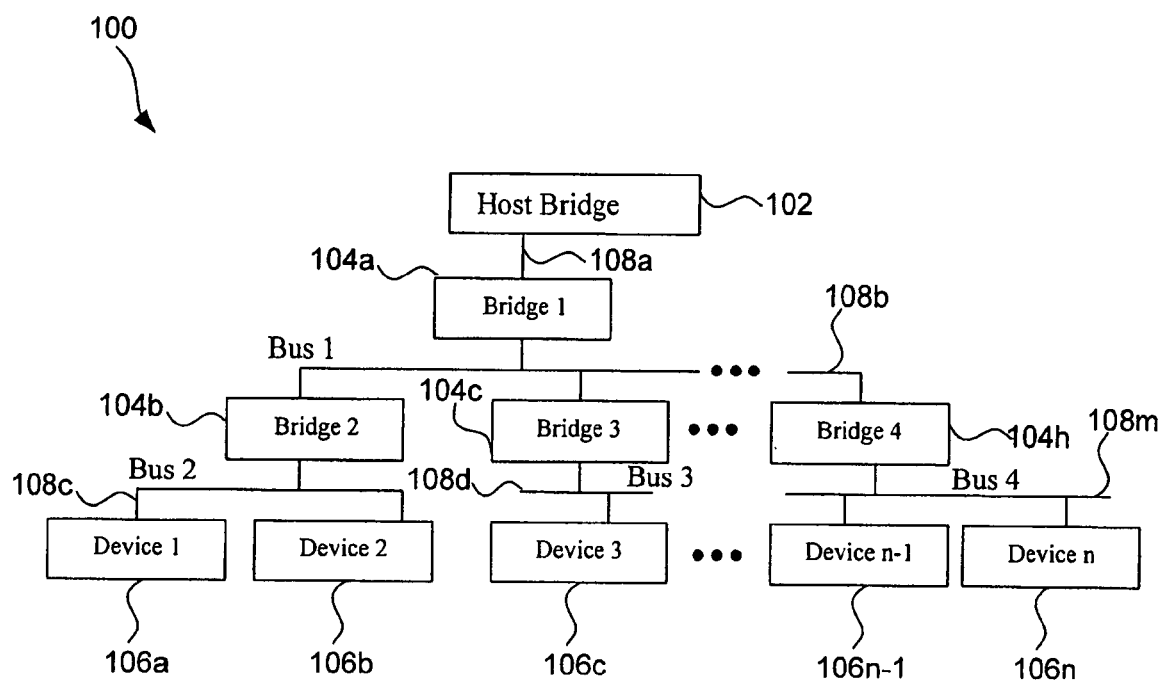
FIG. 1 illustrates a PCI topology.

FIG. 1 illustrates system 100 in a PCI tree topology. System 100 comprises a host bridge 102, bridges 104a-h and devices 106a-n connected by buses 108a-m. Host bridge 102, bridges 104a-h and devices 106a-n may be one or more of network cards, network processors and System on Chips (SOC). Host bridge 102 defines the root of system 100. Bridges 104a-h form a hierarchical network connected by buses 108a-m. Each bridge 104 is associated with a range of device addresses and is enabled to route data to a device 106 that has an address in that range of addresses. Devices 106a-n form "leaves" of the hierarchical bus network.

If the underlying transmission protocol in system 100 is, for example, a PCI protocol or another protocol that requires strictly ordered transmission, then there is a long latency for communication between devices 104. For example, as shown in FIG. 1, for device 106a to send data to device 106n-1 using a PCI model, data is pushed up to bridge 104b followed by bridge 104b placing the data on bus 108b. The data is accepted by bridge 104h and then bridge 104h places the data on bus 108m. The data is then read from bus 108m by device 106n-1.

In the PCI model, writes are classified as "posted commands" and reads are classified as "non-posted commands". A write is considered complete when it is issued on the bus on the path from the perspective of the device or bridge that issues or propagates the write. In the example illustrated in FIG. 1, when device 106a issues a posted command on bus 108c, device 106a considers the write operation as completed. It is now the responsibility of bridge 104b to propagate the write to its destination device 106n-1. Similarly, when bridge 104b puts the write command on bus 108b, the write is considered to be completed by bridge 104b. In a PCI model, to enable upstream and downstream data transfer, each bridge 104 has upstream and downstream queues as described below with reference to FIG. 2.

Figure 2:
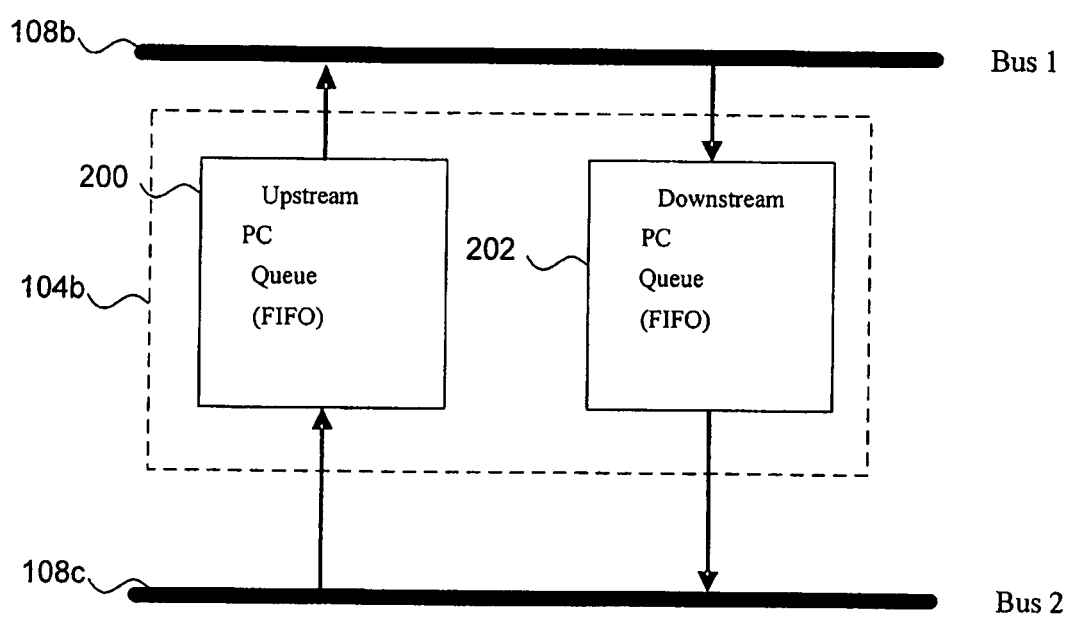
FIG. 2 illustrates posted command queues in a bridge.

FIG. 2 illustrates bridge 104b with an upstream posted command queue 200 and a downstream posted command queue 202 according to a PCI model. Upstream PC queue 200 and downstream PC queue keep track of propagated writes. Each bridge 104 has an upstream PC queue for sending data corresponding to an address that is outside its assigned range of address and a downstream PC queue for sending data corresponding to a range of addresses that is within its assigned range of addresses. Upstream queue 200 of bridge 104b receives data via bus 108c and transmits data upstream to bus 108b. Downstream queue 202 of bridge 104b receives data from bus 108b and propagates data downstream to bus 108c.

The PCI topology utilizes a producer-consumer model. A device sending data is the "producer" and the device receiving data is the "consumer". The producer generates a data stream with a termination flag asserted at the end of the data stream to indicate its termination. The consumer waits till the flag is asserted. Once the flag is asserted, the consumer reads the data. To support such a producer-consumer PCI model posted memory writes moving in the same direction through a bridge complete on the destination bus in the same order in which they were received by the bridge. This is accomplished by using First In First Out (FIFO) queues. Writes crossing a bridge in opposite directions have no ordering relationship. A read response command pushes ahead of it through the bridge any posted writes originated on the same side of the bridge and posted before the read. Before a read transaction can complete on its originating bus, it must pull out of the bridge any posted writes that originated on the opposite side and were posted before the read command completes on the read-destination bus. A read response message returning back to the device that made the read request must push ahead all writes that were posted and accepted by the bridge on the same path before the read response.

FIG. 3 illustrates an example data transaction between device 106a (a producer) and device 106b (a consumer) via bridge 104b in a PCI topology. Device 106a pushes data 300 (posted writes) into upstream PC queue 202 of bridge 104b. Device 106b comprises processor 308 with an associated memory system 310. Device 106b stores data 300 in memory system 310. Processor 308 reads flag 302 and the producer 106a posts read response 304. Read response 304 by device 106a causes all posted writes in PC queue 202 to propagate through bridge 104b. However, the PCI model of using posted commands utilizes a tree-based topology as shown in FIG. 1. The tree based PCI topology fails to utilize the bandwidth offered by a device having multiple physical I/O links or interfaces. For example a system on chip (SOC) comprising more than one physical I/O link or interface is unable to transmit data on all links when using a PCI model. For transmissions which do not require the PCI model, the I/O bandwidth offered by the SOC is unused as described below with reference to FIG. 4.

FIG. 4 illustrates an example system 400 of devices 402a-g with multiple physical interfaces in a PCI topology. Device 402a is configured as the root and devices 402b-g are the leaves in the hierarchy. Device 402a is coupled to devices 402b-g via physical interfaces 404a-t. Due to the PCI tree topology, system 400 does not take full advantage of the available bandwidth offered by each device 402. For example, device 402b has to send data to device 402c sequentially via root device 402a using a single physical interface. Embodiments described below allow for a device 402 that has multiple physical interfaces to send data in a randomized or non-sequential order via multiple interfaces for data transmissions that do not require ordered transmission and to transmit data in-order or sequentially for data transmissions that require ordered transmission as in a PCI topology.

Example Embodiments

FIG. 5 illustrates an example system 500 comprising devices 402a-g having multiple I/O interfaces 404a-t according to an embodiment of the invention. Devices 402 are connected via packet-switching network 502. If communication between devices 402 does not algorithmically require use of a strictly ordered topology, for example a PCI topology, data packets can be routed in random order through more than one of the multiple I/O interfaces of devices 402. In system 500 devices 402 are peers. When a PCI topology or similar "producer-consumer" topology is required, tree topology 504 is pre-configured such that device 402a functions as a root and devices 402b-g function as intermediate bridges or leaves.

FIG. 6 illustrates an exemplary communication stack 600 according to an embodiment of the invention. Communication stack 600 comprises five layers 602-610 with application layer 602 being the top layer. Application layer 602 sends and receives data to/from shim layer 604. Shim layer 604 accepts commands and data from application layer 604 and maps data to physical interfaces in lower layers by using K "virtual interfaces" (VIF) 612a-k. Application 602, based on the type of protocol or transmission topology that is to be used for data transmission, specifies the virtual interface 612a-k via which data should be sent. The virtual interface 612 specified in shim layer 602 maps the data to be transmitted to one or more physical I/O interfaces of the device as required. The mapping between virtual interfaces 612 and physical interfaces is described below. Shim layer 604 also supports QoS (Quality of Service) requirements for traffic classes with different priorities. Transaction layer 606 frames data into packets according to the underlying bus protocol or topology such as PCI, PCI Express (PCI-X), HyperTransport, Cache Coherent Non Uniform Memory Access (CCNUMA) or clustering topology. Devices in a cluster topology may also emulate an Ethernet topology. Devices in the cluster emulating Ethernet can send and receive Ethernet messages. Link layer 608 receives data from transaction layer 606 and arranges for their bits to be fed into a physical network e.g. network 502. Physical layer 610 handles medium signaling issues. Transaction layer 606, link layer 608 and physical layer 610 may conform to, for example, PCI Express or HyperTransport protocol.

FIG. 7A illustrates an example of a first mapping between a virtual interface 612 and a physical interface 404 according to an embodiment of the invention. In the present embodiment, device 402 comprises processor 700 and network interface 704. Network interface 704 comprises fragmenter and synchronizer 710 and T data queues 706a-t coupled to network 502 via physical interfaces 404a-t.

Processor 700 runs application 602 and shim layer 604. Alternatively, the shim layer 604 may be implemented as an Application Specific Integrated Circuit (ASIC). In another embodiment, shim layer 604 may be dedicated hardware external to processor 700 and enabled to accept requests from the processor 700. As will be appreciated by persons of ordinary skill in the art, shim layer 604 may be implemented in hardware, software, firmware or any combination thereof. Shim layer 604 comprises virtual interfaces 612a-k as described above. Each virtual interface 612a-k is uniquely mapped to one or more physical interfaces 404a-t. Network interface 704 implements transaction layer 606, link layer 608 and physical layer 610. Network interface 704 includes fragmenter and synchronizer 710 to fragment, schedule and synchronize packets if required. Network interface 704 also includes T data queues 706a-t coupled to corresponding T physical interfaces 404a-t. Physical interfaces 404 couple device 402a to packet switching network 502. Devices 402b-g are also coupled to packet switching network 502 via their respective physical interfaces.

Application 602 uses VIFa 612a to transmit data sequentially or in-order (e.g. un-cacheable I/O operations or data transfer requiring a PCI topology) via a single physical interface 404a. VIFa 612a maps data to physical interface 404a via queue 706a. All writes are pushed out by VIFa 612a to interface 404a in sequential order. Before a read response is delivered via VIFa 612a, all prior writes are pushed out to interface 404a.

FIG. 7B illustrates an example of a second mapping between virtual interface 612 and physical interface 404 according to an embodiment of the invention. Application 602 maps to VIFb 612b for data or commands that do not require to be sent in-order or received by the destination in-order. VIFb 612b maps data to one or more available physical interfaces 404a-t. For example, cache coherence commands issued by application 602 in a CCNUMA configuration do not require strict sequential ordering as in a PCI topology. Data packets sent to VIFb 612b are transmitted in random order through interfaces 404a-t. Packets sent via VIFb 612b may reach their destination in random order. VIFb 612b is mapped to each of physical interfaces 404a-t to enable a data packet to be transmitted via any available interface 404a-t.

FIG. 7C illustrates an example of a third mapping between a virtual interface 612 and physical interface 404 according to an embodiment of the invention. For transmissions of data greater than a predetermined threshold that does not have to be transmitted in a strict transmission order, application 602 maps to VIFc 612c. This enables transmission of large amounts of data that can be benefit from the bandwidth provided by multiple physical interfaces. Application 602 determines if the data to be transmitted is greater in size than a predetermined threshold. If the data is greater than the predetermined threshold then it is fragmented into a plurality of data streams with a synchronization message a the end of each data stream. Synchronization messages at the end of each data stream indicate termination of transmission for that data stream. The synchronization messages enable a receiving device to re-assemble the fragmented data into its original form. For example, application 602 may need to send a large amount of data (e.g. 1500 bytes) in a CCNUMA or clustering topology. VIFc 612c is coupled to fragmenter and synchronizer 710 to fragment and transmit data in random order with synchronization messages at end of data streams to indicate end of transmission. VIFc 612c maps to each of physical interfaces 404a-t via fragmenter and synchronizer module 710. Fragmenter and synchronizer 710 partitions the 1500 bytes of data into smaller packets (for example 64 bytes by packet). Fragmenter and synchronizer 710 schedules and sends the smaller packets through all available interfaces 404a-t in parallel. At the completion of sending out the 1500 bytes in smaller packets, fragmenter and synchronizer 710 inserts a synchronization (SYNC) message at the end of each queue 706. Thus, each queue 706 stores data packets followed by a SYNC packet to indicate end of that stream of packets. The SYNC packet pushes data packets to their destination which may be, for example, one of devices 402b-g. At the receiving end a destination device 402b-g acknowledges the SYNC message by sending a corresponding synchronization acknowledgement (SYNC-ACK) message. The SYNC-ACK message received by device 402a is sent to application 602 to indicate receipt of data at the destination. Sending data in parallel data streams via each of physical interfaces 404a-t provides a faster rate of transmission than a PCI topology and enables device 402 to better utilize the bandwidth provided by multiple physical interfaces 404.

FIG. 8 illustrates an example flowchart 800 of a method for transmitting data using a device having multiple I/O interfaces according to an embodiment of the invention. Flowchart 800 will be described with reference to the example operating environment depicted in FIGS. 7A-C. In an embodiment, the steps illustrated in FIG. 8 are performed by device 402. However, the flowchart is not limited to that embodiment. Note that some steps shown in flowchart 800 do not necessarily have to occur in the order shown.

In step 802, data is received for transmission. For example, application 602 may receive or generate data for transmission.

In step 804, it is determined whether data has to be transmitted in sequential order. For example, if the underlying bus protocol or topology requires ordered transmission (e.g., the PCI protocol) then data is transmitted sequentially. In an example, application 602 determines whether data is to be transmitted in a sequential order.

In step 806, if it is determined in step 804 that data is to be transmitted in a sequential order, data is mapped to a first virtual interface for sequential data transfer. For example, application 602 maps to VIFa 612a for sequential data transfer.

In step 808, the first virtual interface maps data to a single physical interface for sequential data transmission. In an embodiment, data may initially be stored in a data queue coupled to the physical interface prior to transmission. For example, VIFa 612a maps to physical interface 404a and stores data in queue 706a for buffering prior to transmission.

In step 810, if it is determined that data does not have to be transmitted sequentially in step 804, it is determined whether data is to be fragmented and/or synchronized so as to benefit from the multiple I/O interfaces. For example, application 602 determines whether data is to be fragmented and/or synchronized prior to transmission based on the size of the data as compared to a predetermined threshold size. In alternate embodiments, other factors may be considered, such as packet size specified by underlying protocol to determine whether the data is to be fragmented and synchronized.

In step 812, if it is determined in step 810 that data is not to be fragmented and/or synchronized, data is mapped to a second virtual interface. For example, application 602 maps data to VIFb 612b if data can be transmitted in random order without the need for fragmentation or synchronization.

In step 814, the second virtual interface maps to all available physical interfaces for data transmission in random order. In an embodiment, data may initially be stored in data queues coupled to the physical interfaces prior to transmission. For example, VIFb 612b maps to physical interfaces 404 and buffers data in corresponding queues 706 prior to transmission.

In step 816, if it is determined in step 810 that data is to be fragmented and/or synchronized, data is mapped to a third virtual interface. For example, application 602 maps to VIFc 612c if data is to be fragmented and/or synchronized and transmitted via multiple interfaces to take advantage of the available bandwidth.

In step 818, the third virtual interface maps to all available physical interfaces via a fragmenter and synchronizer for data transmission. In an embodiment, data is fragmented and initially stored in data queues coupled to the physical interfaces prior to transmission. For example, VIFc 612c uses fragmenter and synchronizer 710 to fragment data and map it to physical interfaces 404. The fragmented data is stored in queues for buffering prior to transmission.

In step 820, synchronization messages are sent at the end of each data queue to indicate end of transmission for a data stream stored in the data queue. For example, fragmenter and synchronizer 710 inserts a synchronization message at the end of each data stream in queues 706 to indicate end of the associated data stream. At the receiving end, the receiver reassembles data from the data streams back into the form of the original data packet prior to fragmentation.

FIG. 9 illustrates an alternate embodiment of device 402a. Device 402a is a System on Chip (SOC) comprising P processors 700a-p, bus 800, memory controller (MC) 802, node controller (NC) 804, packet manager 806, off-chip memory 808, on-chip memory (OCM) 810 and network interface 704. Network interface 704 supports QoS by scheduling traffic from virtual interfaces running on one or more of processors 700 to physical interfaces 404a-t. Each physical interface 404 supports multiple virtual channels with multiple priority levels. In a CCNUMA configuration, processors 700 are enabled to access off-chip memories coupled to devices 404b-g. Node controller (NC) 804 maintains cache coherence between devices 404a-g. Packet Manager (PM) is a cross-chip Direct Memory Access (DMA) engine that enables device 402a to send large amounts of data by fragmenting and scheduling using fragmenter and synchronizer 710.

The following description of a general purpose computer system is provided for completeness. The present invention can be implemented in hardware, firmware, software, and/or combinations thereof. Consequently, the invention may be implemented in the environment of a computer system or other processing system. An example of such a computer system 1000 is shown in FIG. 10. The computer system 1000 includes one or more processors, such as processor 1004. Processor 1004 can be a special purpose or a general purpose digital signal processor. The processor 1004 is connected to a communication infrastructure 1006 (for example, a bus or network). Various software implementations are described in terms of this exemplary computer system. After reading this description, it will become apparent to a person skilled in the relevant art how to implement the invention using other computer systems and/or computer architectures.

Computer system 1000 also includes a main memory 1005, preferably random access memory (RAM), and may also include a secondary memory 1010. The secondary memory 1010 may include, for example, a hard disk drive 1012, and/or a RAID array 1016, and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. As will be appreciated, the removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCM-CIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path 1026. Communications path 1026 carries signals 1028 and may be implemented using wire or cable, fiber optics, a phone line, a cellular phone link, an RF link and other communications channels.

The terms "computer program medium" and "computer usable medium" are used herein to generally refer to media such as removable storage drive 1014, a hard disk installed in hard disk drive 1012, and signals 1028. These computer program products are means for providing software to computer system 1000.

Computer programs (also called computer control logic) are stored in main memory 1008 and/or secondary memory 1010. Computer programs may also be received via communications interface 1024. Such computer programs, when executed, enable the computer system 1000 to implement the present invention as discussed herein. In particular, the computer programs, when executed, enable the processor 1004 to implement the processes of the present invention. Where the invention is implemented using software, the software may be stored in a computer program product and loaded into computer system 1000 using raid array 1016, removable storage drive 1014, hard drive 1012 or communications interface 1024.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A non-transitory computer program product comprising a computer useable medium including computer executable instructions stored therein that, when executed by a communications device having a plurality of physical interfaces, cause the communications device to perform a method, the method comprising:
receiving data from an application layer;
determining whether an underlying network topology corresponds to a first network topology that requires sequential data transmission or to a second network topology that does not require sequential data transmission according to which the data received from the application layer is to be transmitted;
mapping the data received from the application layer to a single first physical interface using a first virtual interface in a shim layer if the determined underlying network topology corresponds to the first network topology;
mapping the data received from the application layer to a plurality of physical interfaces that include the first physical interface using a second virtual interface in the shim layer when the determined underlying network topology corresponds to the second network topology, wherein the first physical interface and the plurality of physical interfaces are part of a shared set of physical interfaces;
transmitting the data received from the application layer sequentially via the single first physical interface that is part of the shared set of physical interfaces, for the first network topology;
framing the data received from the application layer into multiple packets and transmitting the packets in random order via the plurality of physical interfaces that are part of the shared set of physical interfaces and include the first physical interface, for the second network topology; and
transmitting the data received from the application layer for both the first network topology and the second network topology using the shared set of physical interfaces.

2. The non-transitory computer program product of claim 1, further comprising computer executable instructions for using a fragmenter and synchronizer module in a network interface to partition data into a plurality of packets prior to transmission according to the second network topology.

3. The non-transitory computer program product of claim 2, further comprising computer executable instructions for transmitting the plurality of packets in a plurality of packet streams via the plurality of physical interfaces.

4. The non-transitory computer program product of claim 3, further comprising computer executable instructions for instructing the fragmenter and synchronizer module to transmit a synchronization message at the end of each of the plurality of packet streams.

5. The non-transitory computer program product of claim 4, wherein a synchronization message associated with a packet stream indicates termination of the associated packet stream and enables a receiving device to re-assemble the plurality of packet streams.

6. The non-transitory computer program product of claim 1, wherein the first network topology is a Peripheral Component Interconnect (PCI) topology.

7. The non-transitory computer program product of claim 1, wherein the second network topology is a Cache Coherent Non Uniform Memory Access (CCNUMA) or a clustering topology.

8. The non-transitory computer program product of claim 7, wherein the communications device is a System on Chip (SOC) unit including a node controller and a packet manager.

9. The non-transitory computer program product of claim 8, wherein the data received from the application layer is transmitted in random order in response to a cache coherence command issued by the node controller.

10. A method of transmitting data using a device having a plurality of physical interfaces, comprising:
receiving data from an application layer;
determining whether an underlying network topology corresponds to a first network topology that requires sequential data transmission or to a second network topology that does not require sequential data transmission according to which the data received from the application layer is to be transmitted;
mapping the data received from the application layer to a single first physical interface using a first virtual interface in a shim layer if the determined underlying network topology corresponds to the first network topology;
mapping the data received from the application layer to a plurality of physical interfaces that include the first physical interface using a second virtual interface in the shim layer if the determined underlying network topology corresponds to the second network topology, wherein the first physical interface and the plurality of physical interfaces are part of a shared set of physical interfaces;

transmitting the data received from the application layer in sequential order via the single first physical interface that is part of the shared set of physical interfaces for the first network topology;

framing the data received from the application layer into multiple packets and transmitting the multiple packets in random order via the plurality of physical interfaces that are part of the shared set of physical interfaces and includes the first physical interface, for the second network topology; and transmitting the data for both the first network topology and the second network topology using the shared set of physical interfaces.

11. The method of claim 10, wherein the first network topology is a Peripheral Component Interconnect (PCI) topology and the second network topology is a Cache Coherent Non Uniform Memory Access (CCNUMA) or a clustering topology.

12. The method of claim 10, further comprising selecting a virtual interface to map the data received from the application layer to one or more physical interfaces.

13. The method of claim 12, further comprising determining a mapping between the virtual interface and the one or more physical interfaces based on the determined underlying network topology.

14. The method of claim 10, further comprising scheduling the multiple packets prior to transmission via the plurality of physical interfaces for the second network topology.

15. The method of claim 14, further comprising transmitting synchronization messages associated with packet streams transmitted via the plurality of physical interfaces.

16. The method of claim 10, further comprising, prior to the framing: determining whether the data is to be fragmented based on a size of the data or a protocol to be used for transmission if the determined network topology corresponds to the second network topology.

17. A method of transmitting data in a System on Chip (SOC) unit having a plurality of physical interfaces, comprising:

receiving data from an application layer;

determining whether an underlying network protocol corresponds to a first network protocol that requires sequential data transmission or to a second network protocol that does not require sequential data transmission to transmit the data;

determining a virtual interface to transmit the data based on the determined underlying network protocol;

determining a mapping between the virtual interface and the plurality of physical interfaces based on the determined underlying network protocol;

mapping the data received from the application layer to a single first physical interface using a first virtual interface in a shim layer when the determined underlying network protocol topology corresponds to the first network protocol;

mapping the data received from the application layer to the plurality of physical interfaces that include the first physical interface using a second virtual interface in the shim layer when the determined underlying network protocol corresponds to the second network protocol, wherein the first physical interface and the plurality of physical interfaces are part of a shared set of physical interfaces;

transmitting the data received from the application layer via the single first physical interface that is part of the shared set of physical interfaces, for the first network protocol; and framing the data received from the application layer into a plurality of packets and transmitting the plurality of packets via the plurality of physical interfaces that are part of the shared set of physical interfaces and include the first physical interface, for the second network protocol.

18. The method of claim 17, wherein the first protocol is a Peripheral Component Interconnect (PCI) protocol and the second protocol is a Cache Coherent Non Uniform Memory Access (CCNUMA) protocol.

19. The method of claim 17,
wherein the application layer determines the virtual interface based on the determined protocol to transmit the data.

20. A System On Chip (SOC) unit, comprising:

a network interface including a plurality of physical input/output (I/O) interfaces coupled to a processor; and a hardware shim layer configured to receive data from an application layer and to map the received data for transmission, using virtual interfaces, to a single first physical I/O interface for sequential data transmission for a first protocol that requires sequential data transmission and to a plurality of physical I/O interfaces that include the first physical interface for transmission of the data in random order for a second protocol that does not require sequential data transmission, wherein the first physical I/O interface and the plurality of physical I/O interfaces are part of a shared set of physical I/O interfaces.

21. The SOC unit of claim 20, wherein the network interface is enabled to partition the data into packets and transmit the packets via the plurality of physical I/O interfaces for a Cache Coherent Non Uniform Memory Access (CCNUMA) or a clustering topology.

* * * * *